(12) United States Patent
Yamaguchi (10) Patent No.: US 7,484,798 B2
(45) Date of Patent: Feb. 3, 2009

(54) CAR SEAT

(75) Inventor: Hiroyoshi Yamaguchi, Yokohama (JP)

(73) Assignee: NHK Spring Co., Ltd., Yokohama-shi (JP)

( * ) Notice: Subject to any disclaimer, the term of this patent is extended or adjusted under 35 U.S.C. 154(b) by 0 days.

(21) Appl. No.: 11/898,164

(22) Filed: Sep. 10, 2007

(65) Prior Publication Data

US 2008/0061608 A1      Mar. 13, 2008

(30) Foreign Application Priority Data

Sep. 13, 2006   (JP)   .............................. 2006-248498

(51) Int. Cl.
*B60N 2/42*   (2006.01)
(52) U.S. Cl. .............................. 297/216.12; 297/216.13
(58) Field of Classification Search ............ 297/216.12, 297/216.13, 410
See application file for complete search history.

(56) References Cited

U.S. PATENT DOCUMENTS

| | | | |
|---|---|---|---|
| 6,789,846 B2 * | 9/2004 | Humer et al. .......... | 297/216.12 |
| 7,044,545 B2 * | 5/2006 | Ohchi et al. ........... | 297/216.12 |
| 7,077,472 B2 * | 7/2006 | Steffens, Jr. ........ | 297/216.12 X |
| 7,097,242 B2 * | 8/2006 | Farquhar et al. ....... | 297/216.12 |

FOREIGN PATENT DOCUMENTS

JP    A 2005-212596    8/2005

* cited by examiner

*Primary Examiner*—Anthony D Barfield
(74) *Attorney, Agent, or Firm*—Oliff & Berridge, PLC (57) ABSTRACT

There is provided a car seat, including a seat body having a seat back and a headrest having a pair of legs for connecting the headrest to the seat back at the upper side; a load detecting section provided in the seat back, including a movable portion that moves in a predetermined direction when receiving a load from the seat front side; an elevating mechanism including a moving body that moves in a predetermined direction by interlocking with the movement of the movable portion, and a pair of interlocking members that respectively engage and interlock with the moving body, one leg elevating due to the movement of one interlocking member, and the other leg elevating due to the movement of the other interlocking member; and a forward shifting section that shifts the headrest side of the pair of legs forward as the pair of legs elevates.

3 Claims, 9 Drawing Sheets

CAR SEAT

CROSS-REFERENCE TO RELATED APPLICATION

This application claims priority under 35 USC 119 from Japanese Patent Application No. 2006-248498, the disclosure of which is incorporated by reference herein.

BACKGROUND OF THE INVENTION

1. Field of the Invention

The present invention relates to a car seat mounted in a car.

2. Description of the Related Art

One example of a so-called "active headrest" that moves a headrest to the front side of a car when the car is crashed from its back in order to narrow a gap between a head of a passenger of the car and the headrest is disclosed in Japanese Patent Application (Laid-open) No. 2005-212596.

In the active headrest of this type, a lumbar support mechanism is rotatably supported around an axis that extends in right and left direction within a seat back and is urged to the front side by springs. A load that is applied to the seat back when the passenger suddenly moves to the rear side of the car due to inertia caused when the car is crashed from its back turns the lumbar support mechanism to the back by going against urging force of the springs. Along with that, a pair of pulleys around which a wire whose one end is linked to a lumbar support is wound separates from each other.

Because the pair of pulleys is separated, another end of the wire is largely pulled and thereby, a vertical adjustment mechanism of the headrest linked to the other end of the wire is pulled. Because the vertical adjustment mechanism of the headrest linked to the wire is thus pulled, the vertical adjustment mechanism moves to the seat rear side and by interlocking with this, the headrest moves substantially to the front side of the car.

In the vertical adjustment mechanism described above, pins provided in both right and left ends of a mechanism base portion enter guide holes of a pair of mounting brackets mounted to a back frame. The vertical adjustment mechanism moves in the front-rear direction of the seat as the mechanism base portion elevates in a state when the respective pins are guided by these guide holes.

Therefore, there has been a possibility that the vertical adjustment mechanism causes such an inclination that either one of right and left sides of the vertical adjustment mechanism is positioned under the other side when the vertical adjustment mechanism elevates, due to a difference of frictional resistance between an inner peripheral portion of the respective right and left guide hole and the pins, a dimensional error of each member such as the guide holes, pins, back frame, mounting brackets and others, an error in assembling the pins to the mechanism basal portion, an error in assembling the mounting brackets to the back frame and the like. Such inclination hampers smooth movement of the vertical adjustment mechanism and also smooth movement of the headrest, thus leaving a much room for improvement.

SUMMARY OF THE INVENTION

In view of the above-mentioned fact, the present invention provides a car seat having an active headrest mechanism that can smoothly move a headrest.

According to one aspect of the invention, there is provided a car seat, including: a seat body including a seat back and a headrest having a pair of legs, the headrest being connected to the seat back at the upper side of the seat back through the pair of legs; a load detecting section provided in the seat back, the load detecting section including a movable portion that moves in a predetermined direction when receiving a load from the front side of the seat back; an elevating mechanism including a moving body that moves in a predetermined direction by interlocking with the movement of the movable portion, and a pair of interlocking members that respectively engage with the moving body, and move by interlocking with the moving body, one of the pair of legs elevating due to the movement of one of the pair of interlocking members, and the other one of the pair of leg elevating due to the movement of the other one of the pair of interlocking members; and a forward shifting section that shifts the headrest side of the pair of legs forward as the pair of legs elevates.

In the car seat according to this aspect, when a load is applied to the seat back of the seat body from the front side and when this load acts on the load detecting section, the movable portion of the load detecting section moves (displaces). By interlocking with this movement (displacement) of the movable portion, the moving body constituting the elevating mechanism shifts in a predetermined direction. Because the pair of interlocking members engages with this moving body, each one of the pair of interlocking members moves by interlocking with the movement of the moving body when the moving body moves in the predetermined direction. One of the pair of legs elevates due to one of the pair of interlocking members moves and the other one of the pair of legs elevates due to the other one of the pair of interlocking members moves. While the headrest elevates when the respective one of the pair of legs elevates, the part of the pair of legs on the side of the headrest moves forward due to the forward shifting section. Thereby, the headrest moves in a direction of approaching to the head of the passenger sitting on the car seat.

Thus, the force required for elevation is applied to the both of the pair of legs in the car seat of the present invention. Therefore, the pair of legs smoothly and reliably moves and thereby, the headrest smoothly and reliably moves forward.

According to the present aspect, the amounts of the respective movements of the pair of interlocking members corresponding to the movement of the moving body can be made equal.

In the car seat according to the present aspect, when the moving body moves, the pair of interlocking members moves by interlocking with the movement of the moving body. Here, it is possible to readily equalize the elevation of one of the pair of legs with the elevation of the other one of the pair of legs because the movement of one interlocking member is equalized with the movement of the other interlocking member. Thereby, the force required for the elevation and applied to the both of the pair of legs may be readily equalized.

In the present aspect, a moving direction of the moving body is set in a direction along a vertical direction of the seat body; and the pair of interlocking members comprises a pair of rotatable arms that are connected to the moving body rotatably around an axis whose axial direction is in the front-rear direction of the seat body and that rotate as the moving body elevates.

In the car seat of the present aspect, when the movable portion of the load detecting section moves, the movable body moves, i.e., elevates or descends, in the direction along the vertical direction of the seat body. Furthermore, each one of the pair of rotatable arms as the pair of interlocking members is connected to the moving body so as to be rotatable around the axis whose axial direction of the front-rear direction of the seat body. When the moving body moves, i.e., elevates or descends, by interlocking with the movement of the movable portion, the pair of rotatable arms rotates. One of the pair of legs elevates as one of the pair of rotatable arms rotates and the other one of the pair of legs elevates as the other one of the pair of rotatable arms rotates. While the headrest elevates when the respective ones of the pair of legs thus elevates, the part of the pair of legs on the side of the headrest moves forward due to the forward shifting section as the pair of legs elevates. Thereby, the headrest moves in the direction of approaching to the head of the passenger sitting on the car seat.

Because the car seat of the present invention is arranged so that the pair of rotatable arms is turnably connected to the moving body, the elevation of the both of the pair of legs may be readily set corresponding to the movement of the moving body.

BRIEF DESCRIPTION OF THE DRAWINGS

An embodiment of the present invention will be described in detail with reference to the following drawings, wherein:

FIGS. 9A and 9B are diagrammatic views of the sliding unit, wherein FIG. 9A shows a state before its operation and FIG. 9B shows a state after its operation.

DETAILED DESCRIPTION OF THE INVENTION

Configuration of First Embodiment

<Basic Structure of Car Seat>

Figure 1:
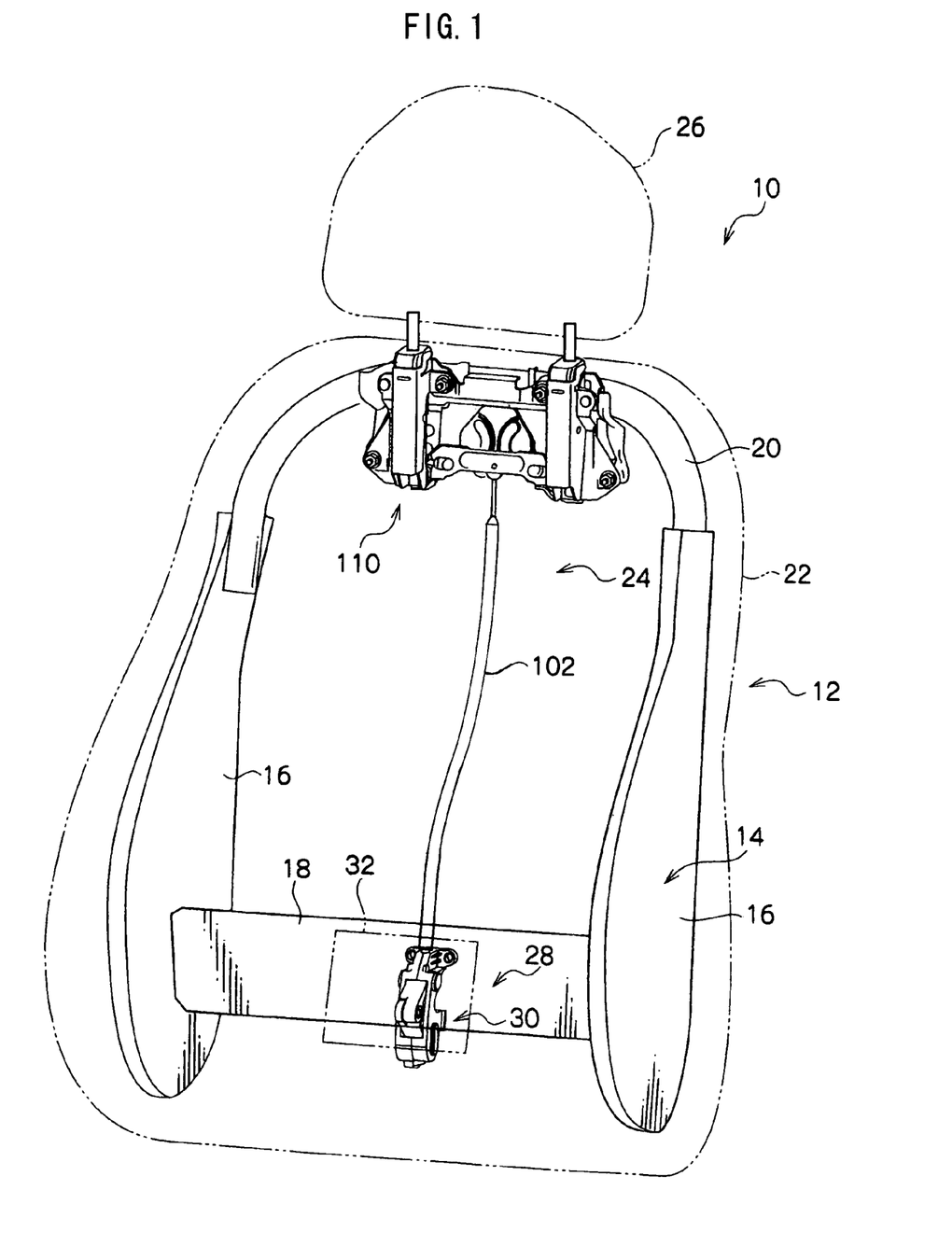
FIG. 1 is a perspective view showing a schematic structure of a main part of a car seat according to one embodiment of the present invention.

FIG. 1 is a perspective view showing a schematic structure of a main part of a car seat 10 according to a first embodiment of the present invention. It is noted that right and left directions will be described as what are seen when one sits on the seat throughout the present specification.

As shown in the figure, a car seat 10 includes a seat back 12 as a seat body. The seat back 12 includes a seat back frame 14 constituting a frame member of the seat back 12. The seat back frame 14 includes a pair of side frames 16. These side frames 16 are formed into a plate shape having a thickness in a width direction of the car seat 10 and are disposed so as to face to each other in the width direction of the car seat 10.

A lower frame 18 is provided on the side of a lower end of the side frames 16. The lower frame 18 is formed into a shape of a plate having a thickness direction in the front-rear direction of the car seat 10. One end of the lower frame 18 in the longitudinal direction is fixed to one side frame 16 and the other end of the lower frame 18 in the longitudinal direction is fixed to the other side frame 16. Thereby, the lower ends of the both side frames 16 are linked integrally by the lower frame 18.

An upper pipe 20 is provided on the side of an upper end of the both side frames 16. The upper pipe 20 is formed substantially in a shape of letter U opened toward the lower side of the car seat 10 by bending a pipe member having a circular cross-section. One end of the upper pipe 20 in the longitudinal direction is secured to the upper end of one side frame 16 and the other end of the upper pipe 20 in the longitudinal direction is secured to the upper end of the other side frame 16. Thereby, the upper ends of the both side frames 16 are linked integrally through the upper pipe 20.

The seat back frame 14 constructed as described above is covered by a pad 22 formed by urethane resin or the like and the pad 22 is covered by a surface skin member not shown formed by fabric, leather or the like.

A headrest 26 constituting an active headrest device 24 as a headrest movable mechanism is disposed above the seat back 12 constructed as described above. The back of head of the passenger who sits on a seat cushion not shown provided on the lower side of the seat back 12 may be leaned to the active headrest device 24 (headrest 26).

<Structure of Active Headrest Device 24>

(Structure of Load Detecting Section 28)

Figure 2:
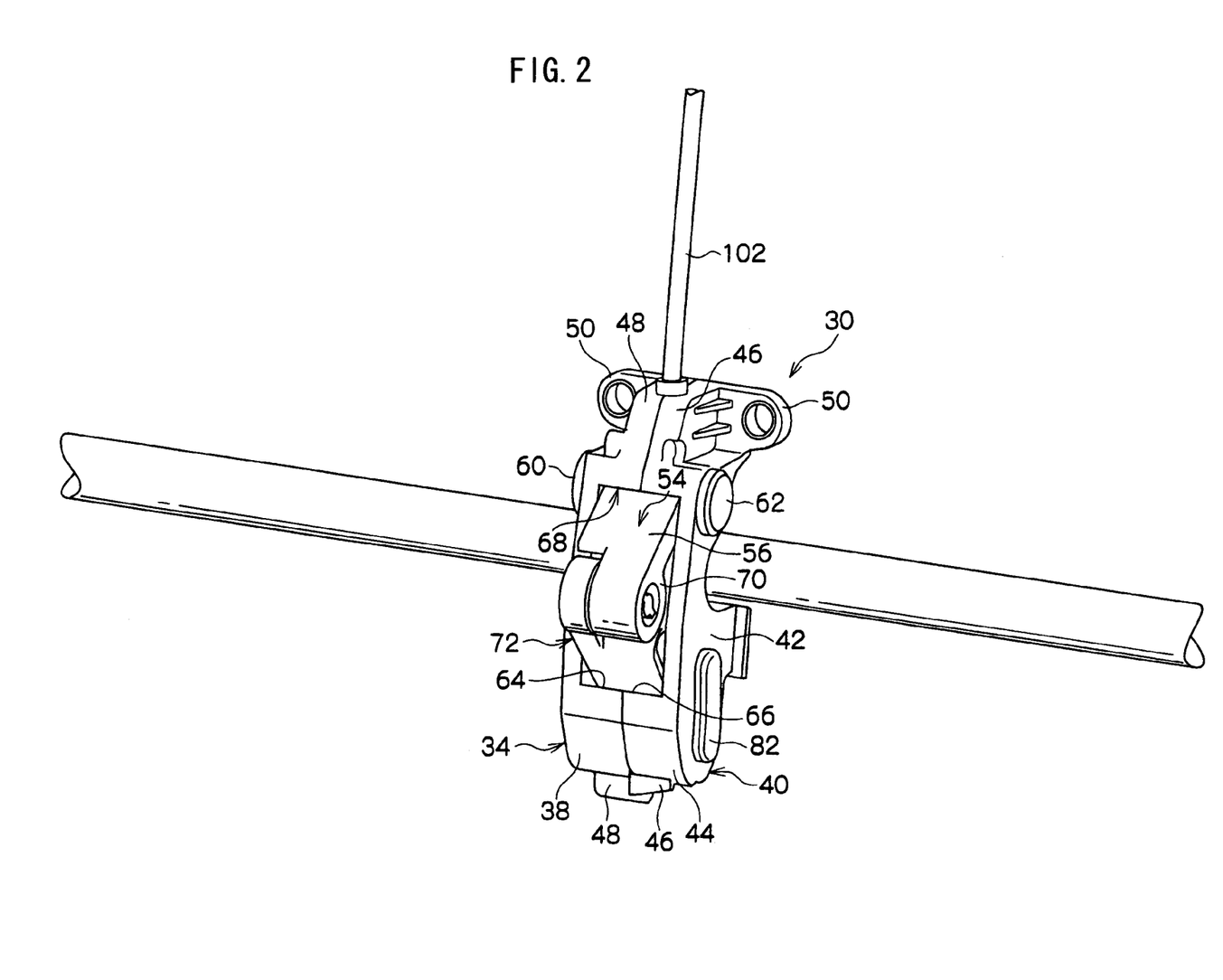
FIG. 2 is a perspective view of a load detecting section of the car seat of one embodiment of the invention.
Figure 3:
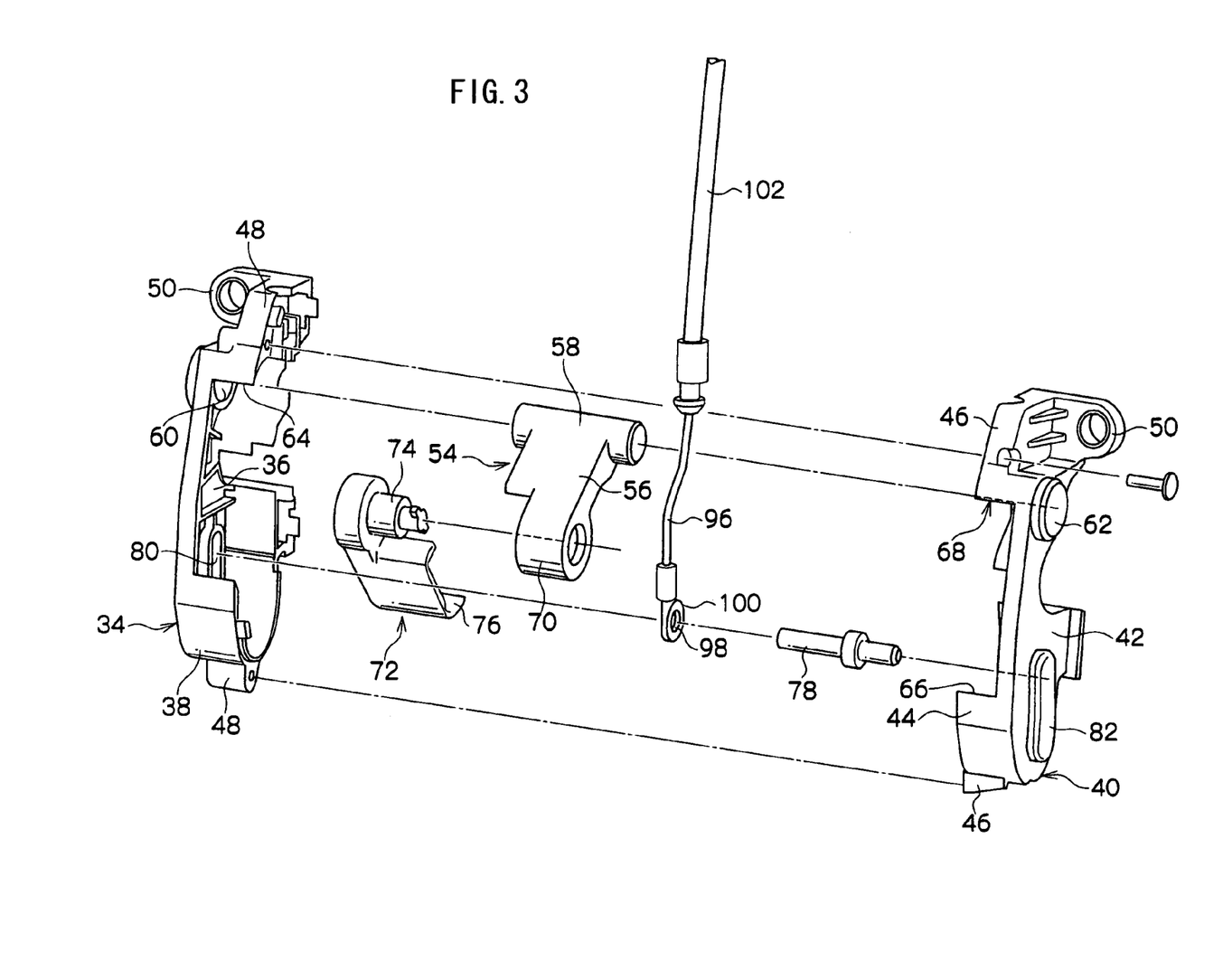
FIG. 3 is an exploded perspective view of the detector of the load detecting section of the car seat of one embodiment of the invention.

As shown in FIG. 1, the active headrest device 24 including the headrest 26 and other components includes a load detecting section 28. The load detecting section 28 includes a detector body 30 and a pressure receiving plate 32. FIG. 2 is an enlarged perspective view of the detector body 30 and FIG. 3 is an exploded perspective view of the detector body 30.

As shown in these figures, the detector body 30 includes a right housing 34. The right housing 34 has a base wall 36 having a thickness direction in the width direction of the car seat 10. The right housing 34 also has a peripheral wall 38. The peripheral wall 38 is formed along an outer peripheral portion of the base wall 36. Therefore, the right housing 34 is shaped to have an opening facing the left side of the car seat 10. A left housing 40 is provided on the left side of the right housing 34 along the width direction of the car seat 10. The left housing 40 has a base wall 42 having a thickness direction in the width direction of the car seat 10. The left housing 40 also has a peripheral wall 44. The peripheral wall 44 is formed along an outer peripheral portion of the base wall 42, so that the left housing 40 is shaped to have an opening facing the right side of the car seat 10.

A fixing portion 46 is formed on the outer peripheral portion of the peripheral wall 44. A fixing pin (not shown) is formed so as to protrude toward the right side of the width direction of the car seat 10. Corresponding to the fixing portion 46 where the fixing pin is formed, a fixing portion 48 is formed on the outer peripheral portion of the peripheral wall 38. A hole opened toward the left in the width direction of the car seat 10 is formed in the fixing portion 48. The fixing pin of the fixing portion 46 is inserted into this hole, so that fixing the left housing 40 and the right housing 34. Thus, opening ends of the right housing 34 and the left housing 40 are closed from each other, making a hollow shape as a whole.

Further, mounting pieces 50 are formed respectively on the fixing portion 48 of the right housing 34 and on the fixing portion 46 of the left housing 40. The right housing 34 and the left housing 40 are fixed to the lower frame 18 by passing bolts through the mounting pieces 50 and the lower frame 18 and by fastening the bolts by nuts.

On the other hand, the detector body 30 includes a rocking piece 54. The rocking piece 54 includes a rocking piece body 56. An axial portion 58 having an axial direction in the width (lateral) direction of the car seat 10 is formed in the rocking piece body 56. A bearing portion 60 having a circular cross-section opened toward the left side along the width direction of the car seat 10 is formed on the base wall 36 of the right housing 34 corresponding to one end of the axial portion 58. In connection with that, a bearing portion 62 having a circular cross-section opened toward the right side along the width direction of the car seat 10 is formed coaxially with the bearing portion 60 on the base wall 42 of the left housing 40 corresponding to the other end of the axial portion 58. The bearing portion 60 rotatably bears one end of the axial portion 58 and the bearing portion 62 rotatably bears the other end of the axial portion 58.

The side of the rocking piece body 56 opposite to the axial portion 58 protrudes to the outside of the right and left housings 34 and 40 from a rectangular opening 68 formed from a cutaway portion 64 formed on the peripheral wall 38 of the right housing 34 and a cutaway portion 66 formed on the peripheral wall 44 of the left housing 40. Further, a connecting portion 70 is formed on the side of the rocking piece body 56 opposite to the axial portion 58. A connecting axis 74 of a slider 72 as a movable portion is rotatably connected to the connecting portion 70 around an axis whose axial direction is along the width direction of the car seat 10. A side of the slider 72 opposite to the connecting shaft 74 passes through the opening 68 and enters inside of the right and left housings 34 and 40.

A shaft mounting portion 76 is formed on the side of the slider 72 opposite of the connecting shaft 74, and a slide shaft 78 whose axial direction extends along the width direction of the car seat 10 is provided in the shaft mounting portion 76. Corresponding to one end of the shaft mounting portion 76 in the axial direction, a guide groove 80 opened toward the left along the width direction of the car seat 10 is formed on the base wall 36 of the right housing 34.

On the other hand, corresponding to the other end of the axial portion 58, a guide groove 82 opened toward the right along the width direction of the car seat 10 is formed on the base wall 42 of the left housing 40. The both guide grooves 80 and 82 are formed as long holes having its longitudinal direction in a height direction of the car seat 10, and their dimension of inner width in their short width direction is slightly larger than a dimension of an outer diameter of the slide shaft 78. The guide groove 80 can guide one end of the slide shaft 78 that enters the guide groove 80 in the longitudinal direction of the guide groove 80, and the guide groove 82 can guide the other end of the slide shaft 78 that enters the guide groove 82 in the longitudinal direction of the guide groove 82.

The connecting portion 70 can be pressed so as to be pushed into the inner side of the right housing 34 and the left housing 40, when the slide shaft 78 is positioned at the longitudinal ends of the long-hole shape guide grooves 80 and 82 that are closer to the bearing portions 60 and 62. Then, the connecting shaft 74 of the slider 72 moves together with the connecting portion 70 towards the inner side of the right housing 34 and the left housing 40, and the connecting shaft 74 thus rotates with respect to the connecting portion 70. Together with this movement, the shaft mounting portion 76 moves together with the slide shaft 78 guided by the guide grooves 80 and 82 so as to separate from the axial portion 58, which is rotatably borne by the bearing portions 60 and 62.

Figure 4:
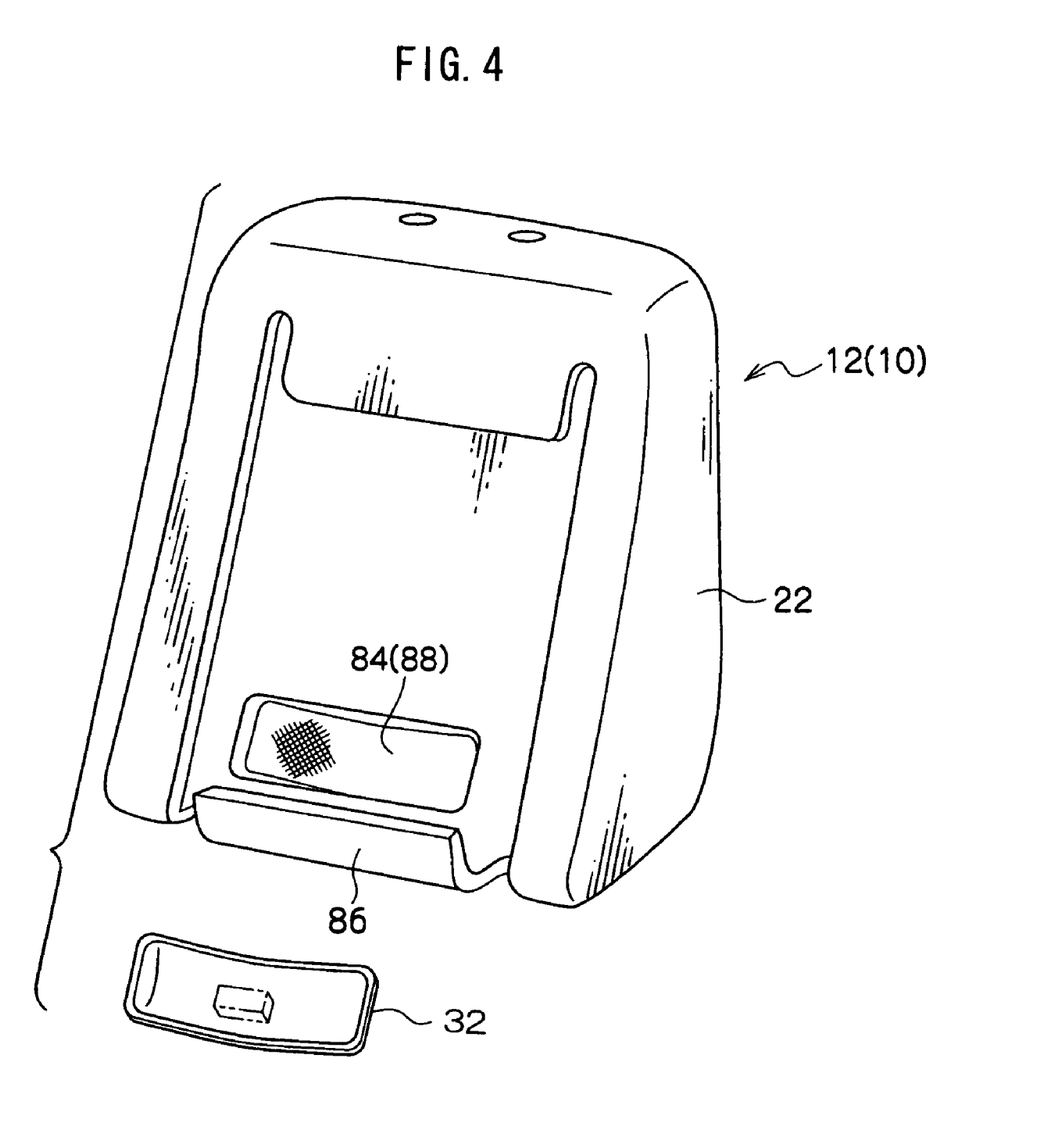
FIG. 4 is a perspective view showing a pressure receiving portion and a pad of the load detecting section of the car seat of one embodiment of the invention.

A pressure receiving plate 32 is provided in front side of the connecting portion 70 projecting from the opening 68. The pressure receiving plate 32 is formed into a plate shape having a thickness direction in the front-rear direction of the car seat 10, and one surface (rear surface) thereof in the thickness direction faces to the connecting portion 70. As shown in FIG. 4, a concave portion 84 is formed in the pad 22 of the seat back 12, corresponding to the pressure receiving plate 32. The opening of the concave portion 84 positions at a back face of the pad 22 and upper side of an engaging portion 86 of the pad 22, which engages with the lower frame 18 and is supported by the lower frame 18.

Figure 5:
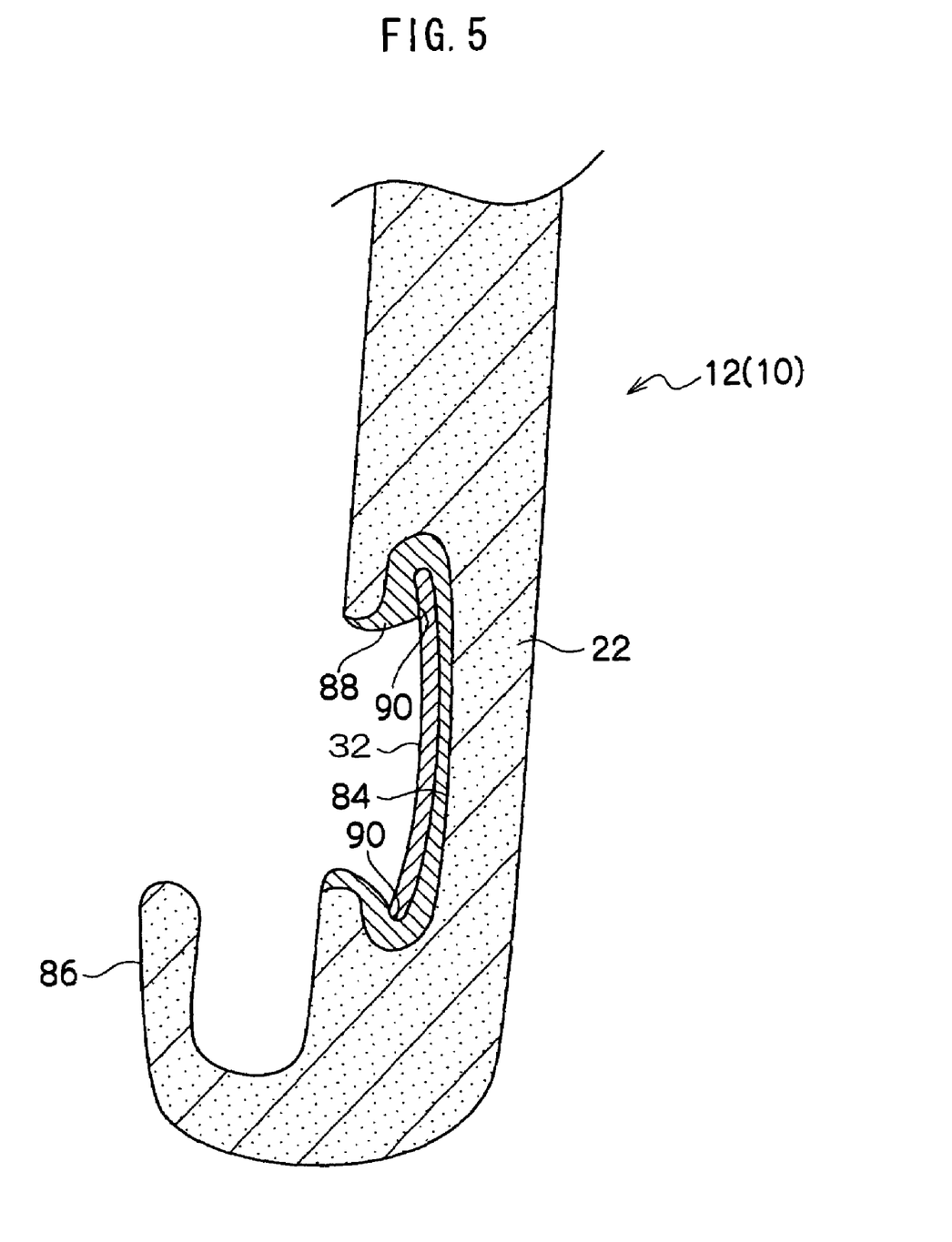
FIG. 5 is a sectional view of the pressure receiving portion and the pad of the load detecting section of the car seat of one embodiment of the invention.

As shown in FIG. 5, a supporter 88 is provided in the concave portion 84. The supporter 88 is made of metal or synthetic resin which is harder than the pad 22. The supporter 88 is provided inside of the concave portion 84 by being secured to the inner surface of the concave portion 84 by adhesive or the like, or by being insert-molded when the pad 22 is molded. The supporter 88 is formed in a concave shape having its opening substantially in the same direction with the opening direction of the concave portion 84. An inner peripheral shape of the supporter 88 is smaller than an outer peripheral shape of the pressure receiving plate 32.

A mounting groove 90, having its opening opened toward radial direction inner side of the opening of the supporter 88, is formed continuously along an inner peripheral direction of the supporter 88. The supporter 88 holds the pressure receiving plate 32 as an outer peripheral portion and its vicinity of the pressure receiving plate 32 enter inside the mounting groove 90. When pressing force propagates from the opposite side of the opening direction of the supporter 88, i.e. from the front side of the car seat 10, through the pad 22 and the bottom of the supporter 88, to the pressure receiving plate 32, the pressure receiving plate 32 approaches to the connecting portion 70 facing thereto and presses the connecting portion 70.

As shown in FIG. 3, the slide shaft 78 described above pass through a plate 100 (hole 98). When the plate 100 moves together with the slide shaft 78 by being guided by the guide grooves 80 and 82, a cable 96 is pulled by the slide shaft 78 and pulling of the cable 96 is released by the slide shaft 78. Another end of the cable 96 is led to a sliding unit 110 through a tube 102.

(Structure of Sliding Unit 110)

Figure 6:
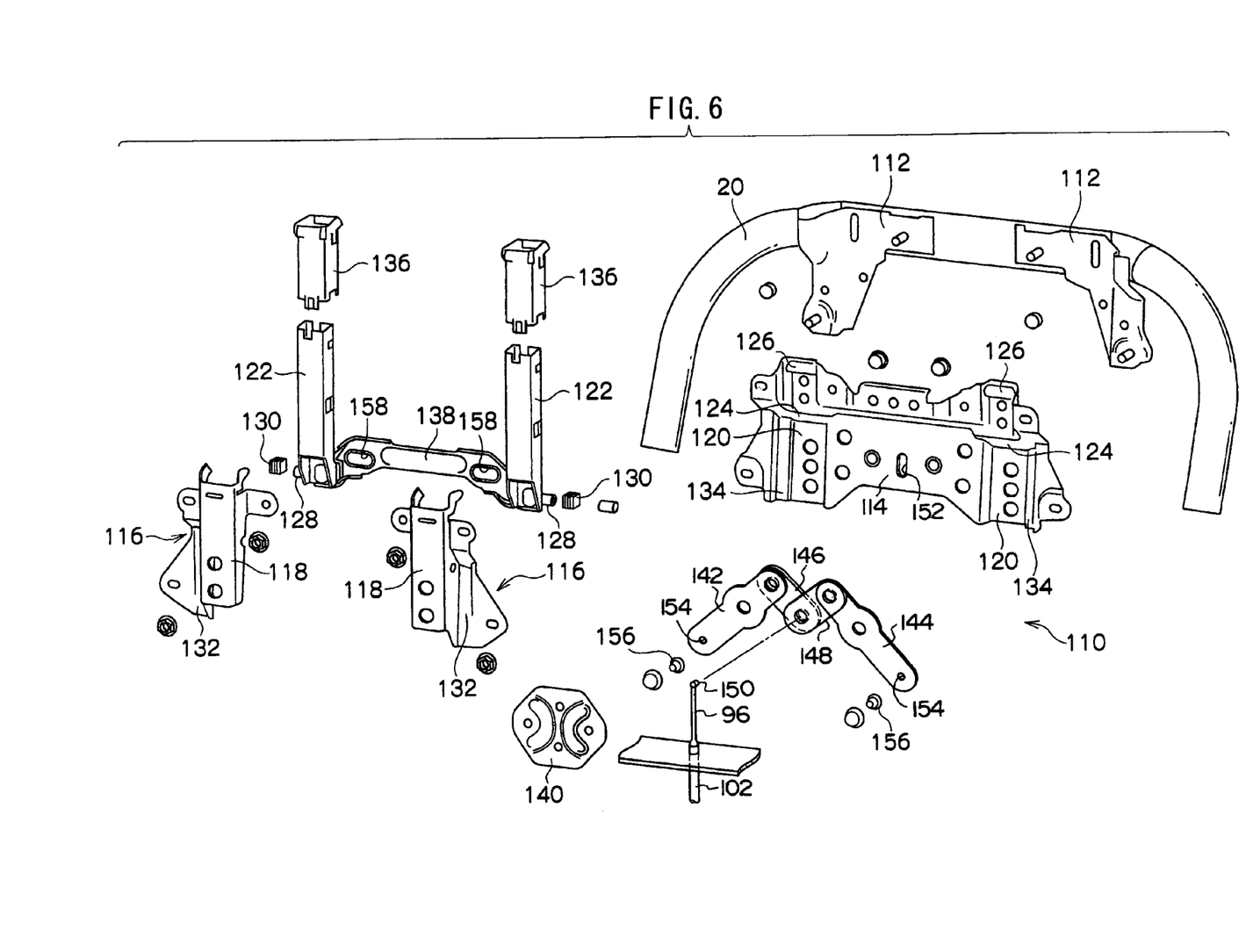
FIG. 6 is an exploded perspective view of a sliding unit of the car seat of one embodiment of the invention.

FIG. 6 is an exploded perspective view of a structure of the sliding unit 110 as an elevating mechanism.

As shown in FIG. 6, the sliding unit 110 includes a pair of right and left unit brackets 112. These unit brackets 112 are plate-shape members appropriately bent or curved. One unit bracket 112 is fixed to the upper pipe 20 on the side of one side frame 16 by screws or the like, and the other unit bracket 112 is fixed to the upper pipe 20 on the side of the other side frame by screws or the like.

A base plate 114 is attached to these unit brackets 112. The base plate 114 is a plate member having a thickness direction basically in the front-rear direction of the car seat 10 and is appropriately bent or curved. A pair of right and left bracket guides 116 is provided at the front side of the base plate 114. One of the pair of bracket guides 116 is fixed to the base plate 114 at the side of one side frame 16 by screws or the like, and the other bracket guide 116 is fixed to the base plate 114 at the side of the other side frame 16 by screws or the like.

Guiding bodies 118 having a U-shaped cross-section in which its opening opens toward the base plate 114 are formed on these bracket guides 116. Corresponding to the guiding bodies 118, base-side guide portions 120, which are bent into a concave (substantially U-shape) in cross-section thereof, and its opening opens toward the bracket guides 116, are formed in the base plate 114. The base-side guide portion 120 is formed so as to face to the guiding body 118, and a headrest bracket 122 as a leg is disposed respectively between each pair of the guide bodies 118 and the base-side guide portions 120.

The headrest bracket 122 is formed in a cylindrical shape having a rectangular cross-section whose longitudinal direction extends substantially in the vertical direction of the car seat 10. An outer peripheral shape of the headrest bracket 122 is sufficiently smaller than an inner peripheral shape of the guide body 118 and the base-side guide portion 120 when they face to each other. The headrest bracket 122 is movable in the vertical direction of the car seat 10 within the guide body 118 and the base-side guide portion 120, and is movable also in the front-rear direction of the car seat 10 until it is interfered by the guide body 118 and the base-side guide portion 120.

A guide portion (wall) 124 is formed on the base plate 114 at the side of an upper end of the base-side guide portion 120. One end of the guide portion 124 is continuously connected to an upper end of a bottom of the base-side guide portion 120. Another end of the guide portion 124 is positioned at the upper and front side of the car seat 10 than the one end, and the other end portion of the guide portion 124 abuts to a portion of an outer periphery of the headrest bracket 122. A normal-time holding portion (bracket guide portion) 126 is formed on the base plate 114 at the side of the other end of the guide portion 124. Similarly to the base-side guide portion 120, the normal-time holding portion 126 is formed into a concave (substantially U-shape) having its opening opened toward the side of the guide body 118. A dimension of an inner width of the normal-time holding portion 126 along the width direction of the car seat 10 is set to be slightly larger than a dimension of a width of the headrest bracket 122 along the same direction.

A shaft 128 is provided integrally with the headrest bracket 122 at the rear side in the vicinity of a lower end portion of the headrest bracket 122. The shaft 128 rotatably bears a slider 130 which is formed into a block shape which is substantially rectangular when viewed from the front, and which constitutes a front shifting section. Corresponding to the slider 130, a slider guide portion 132 composing the front shifting section together with the slider 130 is formed in the bracket guide 116 described above. A slider guiding face 134 facing the slider guide portion 132 is formed in the base plate 114, and together with the slider 130 and the slider guide portion 132 forms the front shifting section. The slider 130 is interposed between the slider guide portion 132 and the slider guiding face 134 and is slidable in the vertical direction of the car seat 10 by being guided by the slider guide portion 132 and the slider guiding face 134.

Note that a direction in which the slider guide portion 132 and the slider guiding face 134 face is inclined in the vertical direction with respect to the front-rear direction of the car seat 10. Therefore, the slider 130 moves toward the rear side of the car seat 10 as it slides upward by being guided by the slider guide portion 132 and the slider guiding face 134.

Figure 9A:
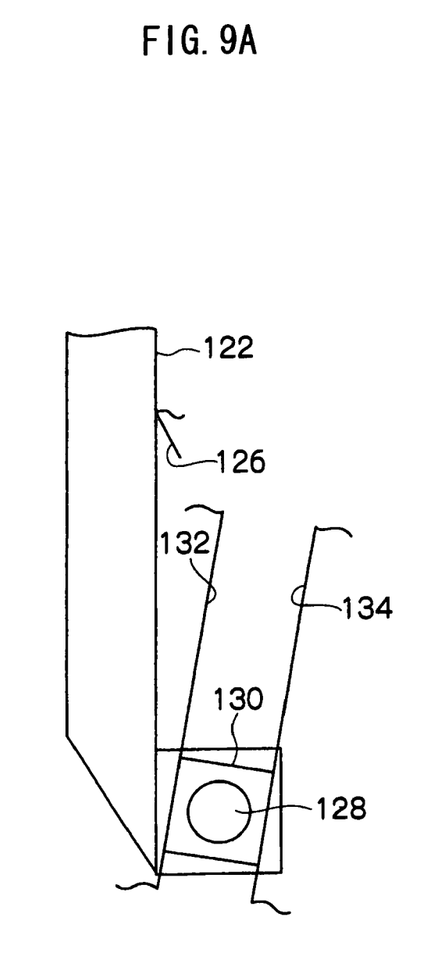
Figure 9B:
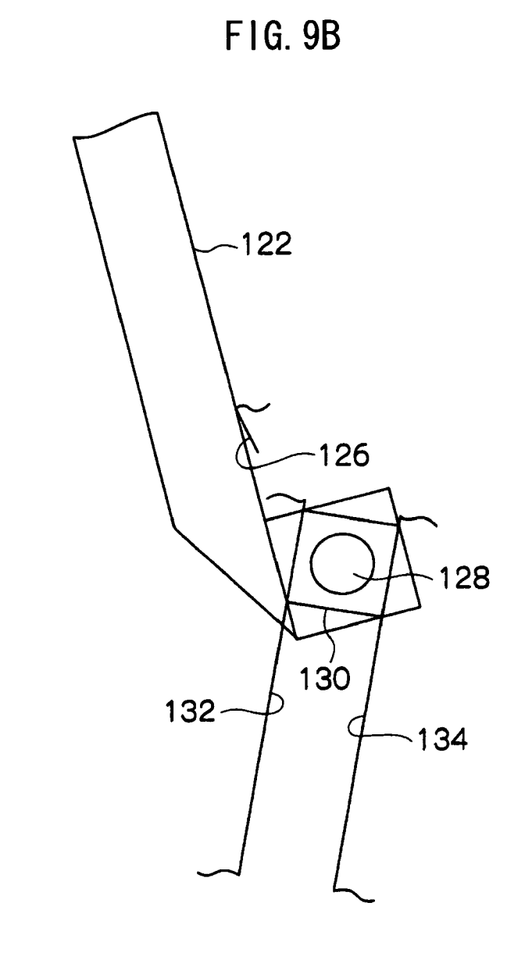

Because the slider 130 moves rearward as it slides upward as shown in diagrammatic views in FIGS. 9A and 9B, the lower end of the headrest bracket 122 also moves rearward. Due to the lower end thus moves rearward, the headrest bracket 122 turns along the concave face of the normal-time holding portion 126. Thereby, the headrest bracket 122 turns forward at a portion upper than the region where the headrest bracket 122 abuts against the normal-time holding portion 126.

As shown in FIG. 6, a guide spacer 136 formed in a cylindrical shape having a rectangular cross-section is attached to an edge (upper end) of the headrest bracket 122 that operates as described above, and the headrest 26 described above is mounted further thereon. On the other hand, a connecting bracket 138 is provided on the rear side of the base end (lower end) of the headrest bracket 122. The connecting bracket 138 is formed in a plate-shape whose longitudinal direction extends along the width direction of the car seat 10 and having a thickness direction in the front-rear direction of the car seat 10. One headrest bracket 122 is connected to one end of the connecting bracket 138 and the other headrest bracket 122 is connected to the other end of the connecting bracket 138.

A cover plate 140 is disposed substantially at the center in the longitudinal direction of the connecting bracket 138 and behind the connecting bracket 138. Furthermore, arms 142 and 144 composing an interlocking member as rotatable arms are disposed behind the cover plate 140. The arm 142 is rotatably supported by the base plate 114, to the right side of the center in a width direction of the car seat 10, around an axis whose axial direction is substantially the front-rear direction of the car seat 10. The arm 144 is rotatably supported by the base plate 114, to the left side of the center in a width direction of the car seat 10, around an axis whose axial direction is substantially the front-rear direction of the car seat 10. The arm 144 has substantially the same shape as the arm 142, and they are disposed symmetrically with respect to the center of the lateral (left-right) direction of the car seat 10.

A connecting piece 146 composing the rotatable arm together with the arm 142 is provided at the left side of the arm 142 along the width direction of the car seat 10. The connecting piece 146 is connected to the arm 142 by one end thereof so as to be relatively rotatable around an axis whose axial direction extends along the front-rear direction of the car seat 10. On the other hand, a connecting piece 148 composing the rotatable arm together with the arm 144 is provided on the right side of the arm 144 along the width direction of the car seat 10. The connecting piece 148 is connected to the arm 144 by one end thereof so as to be relatively rotatable around an axis whose axial direction extends along the front-rear direction of the car seat 10. Further, a distance between the rotational center of the arm 144 and a portion of the arm 144 which is connected to the connecting piece 148, and a distance between the rotational center of the arm 142 and a portion of the arm 142 which is connected to the connecting piece 146, are the same.

Furthermore, the other end of the connecting piece 146 (the opposite side of the portion connected with the arm 142) and the other end of the connecting piece 148 (the opposite side of the portion connected with the arm 144) overlap with each other in the front-rear direction of the car seat 10. A movable slide pin 150 passes through the portion where the connecting piece 146 overlaps with the connecting piece 148, in the front-rear direction of the car seat 10. A distance from the portion of the connecting piece 146 where it is connected with the arm 142, to the portion where it is connected to the slide pin 150, is the same as a distance from the portion of the connecting piece 148 where is connected with the arm 144, to the portion where it is connected to the slide pin 150.

Corresponding to the slide pin 150, a long hole 152 whose longitudinal direction extends along the vertical direction of the car seat 10 is formed in the base plate 114. The slide pin 150 that penetrates through the connecting pieces 148 and 146 and protrudes to the back side of the connecting pieces 148 and 146 enters the long hole 152. Therefore, the slide pin 150 can move (slide) only in the longitudinal direction of the long hole 152. The other end of the cable 96 described above is anchored to the slide pin 150 and the slide pin 150 elevates within the long hole 152 when the cable 96 moves in the longitudinal direction thereof.

On the other hand, hole portions 154 are formed respectively at the other end of the arm 142 (the end at the opposite side of the portion connected with the connecting piece 146, via the rotational center of the arm 142) and at the other end of the arm 144 (the end at the opposite side of the portion connected with the connecting piece 148, via the rotational center of the arm 144). Furthermore, a distance from the rotational center of the arm 142 to the hole portion 154 of the arm 142 is set to be equal with a distance from the rotational center of the arm 144 to the hole portion 154 of the arm 144.

A taper pin 156 is attached to each hole portion 154. The taper pin 156 is formed of a pin body formed by metal or synthetic resin material and whose base end portion is attached to the arm 142 (arm 144), and the pin body being coated by a coating portion formed by a synthetic resin material. The coating portion of the taper pin 156 is tapered toward the side opposite to the base plate 114. These taper pins 156 respectively enter a pair of long holes 158, which are formed in the connecting bracket 138.

One of the pair of long holes 158 is formed at one end side from the center in the longitudinal direction of the connecting bracket 138, and the other long hole 158 is formed at the other and side from the center in the longitudinal direction of the connecting bracket 138. These long holes 158 are formed such that their longitudinal direction extends along the width direction of the car seat 10, and a dimension of inner width in a short-width direction is smaller than a dimension of outer diameter of the base end portion of the taper pin 156. Therefore, a taped face of the taper pin 156 entering the long hole 158 press-contacts an inner peripheral of the long hole 158.

When the slide pin 150 moves up and down by being guided by the long hole 152, the connecting piece 146 rotates corresponding to a distance between the rotational center of the arm 142 and the slide pin 150 and turns the arm 142, and the connecting piece 148 also rotates corresponding to a distance between the rotational center of the arm 144 and the slide pin 150 and turns the arm 144. Because the other end of the respective arms 142 and 144 thus rotates, the taper pin 156 presses the inner peripheral portion of the long hole 158 and moves the connecting bracket 138 up and down.

Operation and Effect of First Embodiment

Next, the operation and effect of the present embodiment will be explained through the explanation of the operation of the active headrest device 24.

When the car mounting the car seat 10 including the active headrest device 24 is, for example, crushed by another car from behind and when a body of the passenger sitting on the car seat 10 presses the seat back 12 from the front side due to reaction of the crush (that is, when the passenger sitting on the car seat 10 falls down forcibly to the seat back 12), the pressure receiving plate 32 that has received the pressure from the body of the passenger moves backward. The pressure receiving plate 32 that has moved backward presses the connecting portion 70 of the rocking piece 54 to the back side.

Due to the connecting portion 70 pressed by the pressure receiving plate 32, the rocking piece 54 rotates the slider 72 around the axial portion 58. Thereby, the slider 72 connected to the connecting portion 70 moves the slide shaft 78 from the ends currently positioned to the other ends of the guide grooves 80 and 82. When the slide shaft 78 thus moves, the cable 96 is pulled via a plate 100. When the slide pin 150 moves downward by being guided by the long hole 152 from a state shown in FIG. 7 to a state shown in FIG. 8 due to the cable 96 being pulled, the slide pin 150 pulls the connecting pieces 146 and 148 downward. By moving downward, the connecting pieces 146 and 148 pull down and turn the arms 142 and 144.

Figure 7:
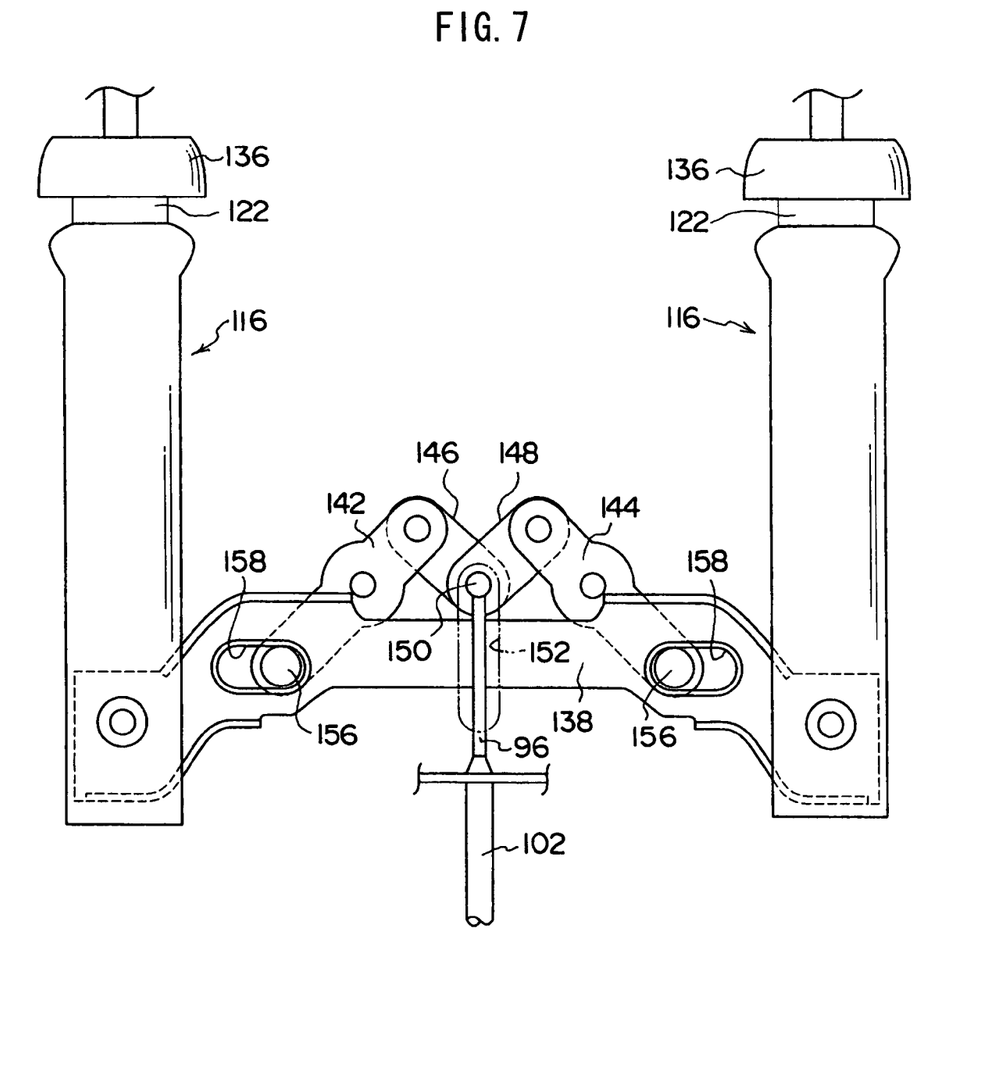
FIG. 7 is a schematic front view of a main part of the sliding unit.
Figure 8:
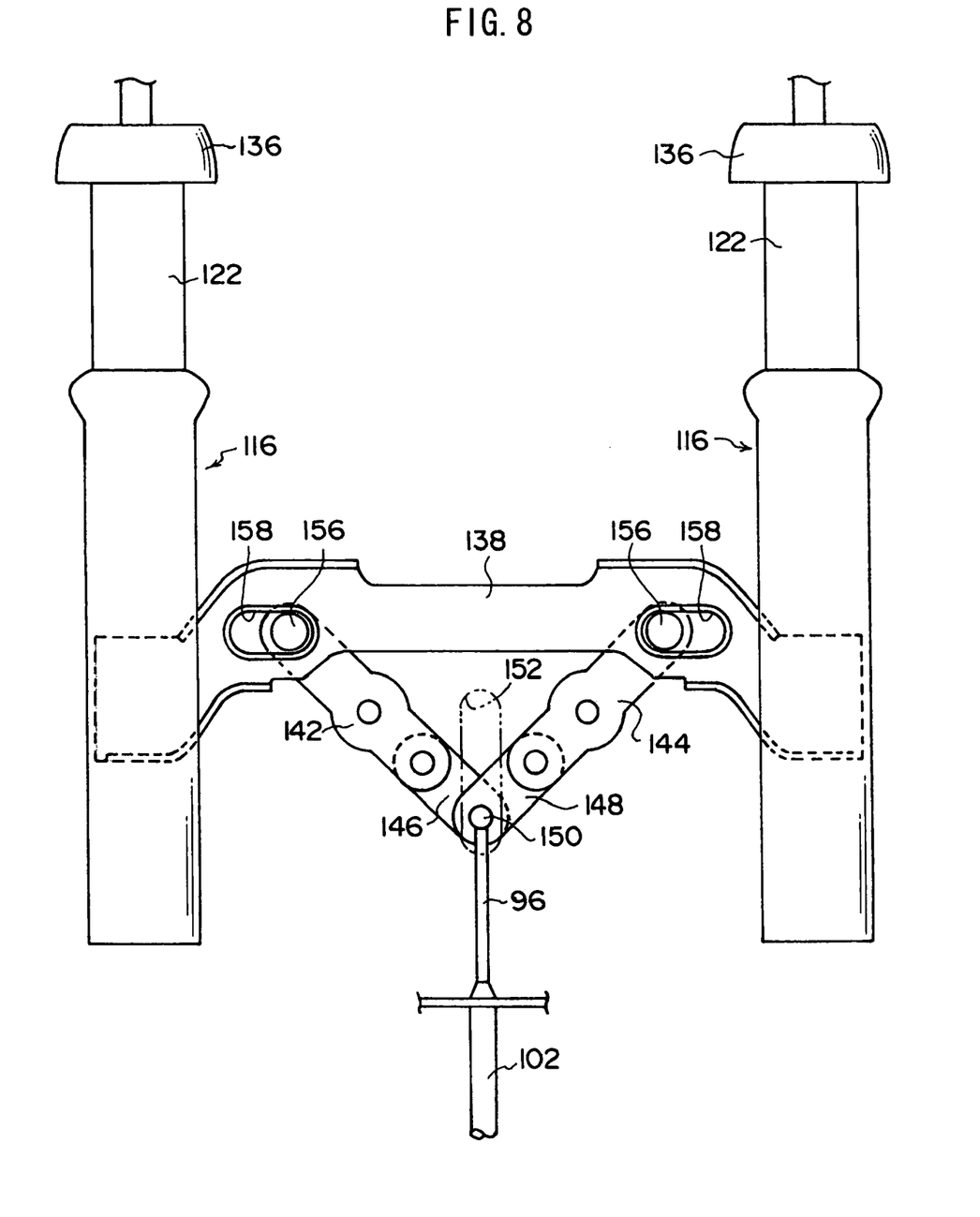
FIG. 8 is a front view corresponding to FIG. 7, showing a state when the sliding unit is operative.

As the arm 142 turns, the portion of the arm 142 where is connected with the connecting piece 146 moves downward and also shifts in the width direction (right and left directions) of the car seat 10. Therefore, although the distance, in the width direction of the car seat 10, from the portion of the arm 142 where is connected with the connecting piece 146 to the slide pin 150 (i.e., the width direction component of the distance between the portion of the arm 142 where is connected with the connecting piece 146 and the slide pin 150) changes, the connecting piece 146 turns about the portion where is connected with the slide pin 150 or the portion where is connected with the arm 142, in correspondence with this change. Thus, the changed amount in the distance component described above can be absorbed, and enables the arm 142 to rotate (turn) smoothly.

Further, as the arm 144 turns, the portion of the arm 144 where is connected with the connecting piece 148 moves downward and also shifts in the width direction (right and left directions) of the car seat 10. Therefore, similarly to the relationship between the arm 142 and the connecting piece 146, the arm 144 turns smoothly because the connecting piece 148 turns about the portion where is connected with the slide pin 150 or the portion where is connected with the arm 144.

As described above, since the arm 142 turns so that the end at the side of the connecting piece 146 moves downward, the arm 142 turns so as to elevate the end at the side opposite to the connecting piece 146. Furthermore, since the arm 144 turns so that the end at the side of the connecting piece 148 moves downward, the arm 144 turns so as to elevate the end at the side opposite to the connecting piece 148. Thereby, the taper pins 156 attached to the both other ends (the elevated ends) of the arms 142 and 144 push up the inner peripheral portions of the long holes 158, i.e., push up the connecting bracket 138. Due to the connecting brackets 138 pushed up, the both headrest brackets 122 move upward. Along with the upward movement of the headrest brackets 122, the sliders 130 slide upward by being guided by the slider guide portions 132 and the slider guiding faces 134.

The sliders 130 move to the rear side of the car seat 10 as it slide upward by being guided by the slider guide portions 132 and the slider guiding faces 134 as described above. Along with this movement, the lower ends of the headrest brackets 122 also move rearward. Thus, because the lower ends of the headrest brackets 122 move rearward while elevating as described above, the headrest bracket 122 rotates along the concave face of the normal-time holding portion 126. Thereby, each portion of the headrest bracket 122 upper than the portion where it abuts against the normal-time holding portion 126 turns forward. Thus, the headrest 26 connected to the headrest brackets 122 via the guide spacers 136 moves forward.

If the back of the head of the passenger sitting on the car seat 10 is not abutting the headrest 26 when the headrest 26 is not yet shifted forward (if the back of the head of the passenger is positioned forward than the headrest 26), the headrest 26 approaches to the back of the head by shifting forward as described above, and reduces the gap between the headrest 26 and the back of the head of the passenger. Thereby, even if the head of the passenger sitting on the car seat 10 moves rearward due to the reaction caused when the car is crushed from its back by another car for example, the headrest 26 can quickly receive the head of the passenger without letting the head move largely rearward.

Here, in the active headrest device 24 applied to the car seat 10, due to the slide pin 150 lowered, the arm 142 pushes up one headrest bracket 122 and the arm 144 pushes up the other headrest bracket 122. Thus, because the both headrest brackets 122 are pushed up concurrently, the headrest brackets 122 will not wrenched in the right and left direction when they are pushed up. Thereby, it is possible to push up the headrest brackets 122 smoothly and steadily, and is possible to steadily move the headrest 26 forward.

Further, in the manner described above, the dimensional relationships (distances) of the shapes of the arms 142 and 144 and the connecting pieces 146 and 148, as well as the dimensional relationships (distances) between the connection positions of each of these members, including relationships to the slide pin 150, are the same (i.e., their dimensional relationships are left-right symmetrical). Therefore, the rotation of the connecting piece 146 and the arm 142 and the rotation of the connecting piece 148 and the arm 144 when the slide pin 150 slides (moves) are symmetrical, and their rotation amounts are equal. Therefore, timing and a push-up stroke when the arm 142 pushes up one headrest bracket 122 are equalized with timing and a push-up stroke when the arm 144 pushes up the other headrest bracket 122. Therefore, as compared to a structure of simply pushing up both headrest brackets, it is possible to prevent or effectively suppress a wrench (lateral inclination caused by a difference of degrees of elevation) of the right and left headrest brackets 122 more steadily.

It is also possible to accurately set the timing and push-up strokes of both headrest brackets 122, simply by adjusting the dimensional (distance) relationships of the shapes and connection positions, including relationships to the slide pin 150, of the arms 142 and 144 and the connecting pieces 146 and 148. Therefore, it is possible to reduce errors between the push-up timing and push-up stroke of one headrest bracket 122 and the push-up timing and push-up stroke of the other headrest bracket 122.

Furthermore, in the active headrest device 24 applied to the car seat 10, the tapered face of the taper pin 156 entering the long hole 158 press-contacts the inner peripheral of the long hole 158. Therefore, it is possible to press the inner peripheral portion of the both long holes 158 concurrently by the taper pins 156 when the both taper pins 156 start to elevate. This also enables the headrest brackets 122 to be steadily and concurrently pushed up and the headrest 26 to steadily move forward.

Furthermore, in the active headrest device 24 applied to the car seat 10, the slider 130 is formed in rectangular shape when seen in front view. Therefore, the slider 130 has contact areas with the slider guide portion 132 and the slider guiding face 134 corresponding to length of sides along the slider guide portion 132 and the slider guiding face 134, among four sides of the slider 130 seen in the front view. Therefore, it is possible to reduce surface pressure in the regions where the slider 130 abuts to the slider guide portion 132 and the slider guiding face 134. Accordingly, this enables the slider 130 to steadily slide and the headrest bracket 122 to steadily elevate and move forward.

Still more, since the tapered face of the taper pin 156, which is entered into the long hole 158, press-contacts with the inner peripheral of the long hole 158, looseness that may be caused in the arms 142 and 144 during a normal operation can be suppressed by the connecting bracket 138. Thereby, it becomes possible to improve silent performance during the normal operation.

As described above, the car seat according to the present invention can smoothly and steadily move the headrest forward by smoothly and steadily moving the pair of legs of the headrest.

The car seat of the present invention can also readily equalize the forces applied to the pair of legs that is required for elevating the pair of legs.

Still more, it becomes easy to set the elevation amount at the both sides of the pair of legs corresponding to the movement of the moving body because the pair of rotatable arms is rotatably connected to the moving body in the car seat of the present invention.

What is claimed is:

1. A car seat, comprising:
   a seat body including a seat back and a headrest having a pair of legs, the headrest being connected to the seat back at the upper side of the seat back through the pair of legs;
   a load detecting section provided in the seat back, the load detecting section including a movable portion that moves in a predetermined direction when receiving a load from the front side of the seat back;
   an elevating mechanism including a moving body that moves in a predetermined direction by interlocking with the movement of the movable portion, and a pair of interlocking members that respectively engage with the moving body, and move by interlocking with the moving body, one of the pair of legs elevating due to the movement of one of the pair of interlocking members, and the other one of the pair of legs elevating due to the movement of the other one of the pair of interlocking members; and
   a forward shifting section that shifts the headrest side of the pair of legs forward as the pair of legs elevate;
   wherein a moving direction of the moving body is set in a direction along a vertical direction of the seat body; and
   the pair of interlocking members comprise a pair of rotatable arms that are connected to the moving body rotatably around an axis whose axial direction is in the front-rear direction of the seat body and that rotate as the moving body elevates.

2. The car seat according to claim 1, wherein the amounts of the respective movements of the pair of interlocking members corresponding to the movement of the moving body are equal.

3. A car seat, comprising:
   a seat body including a seat back and a headrest having a pair of legs;
   a moveable load detecting section provided in the seat back, the moveable load detecting section horizontally moving when receiving a load from the front side of the seat back;
   a moving body perpendicularly interlocking with the movable load detecting section;
   a pair of hinged arms that engage and move with the moving body, each one of the pair of legs being paired with one of the hinged arms and elevating independently with respect to each other due to the movement of the pair of hinged arms; and
   a forward shifting section that shifts the headrest side of the pair of legs forward as the pair of legs elevate;
   wherein a moving direction of the moving body is set in a direction along a vertical direction of the seat body.

* * * * *